(12) United States Patent
Koukios

(10) Patent No.: US 9,320,987 B2
(45) Date of Patent: Apr. 26, 2016

(54) METHOD FOR THE REMOVAL OF INORGANIC COMPONENTS FROM BIOMASS, COALS, WASTES, RESIDUES AND SLUDGES FROM SEWAGE TREATMENT

(75) Inventor: Emmanuel G. Koukios, Athens (GR)

(73) Assignee: Thermoretinary Technologies Inc., New York, NY (US)

( * ) Notice: Subject to any disclaimer, the term of this patent is extended or adjusted under 35 U.S.C. 154(b) by 501 days.

(21) Appl. No.: 13/995,821

(22) PCT Filed: Dec. 27, 2011

(86) PCT No.: PCT/EP2011/074114
§ 371 (c)(1),
(2), (4) Date: Oct. 5, 2013

(87) PCT Pub. No.: WO2012/089744
PCT Pub. Date: Jul. 5, 2012

(65) Prior Publication Data
US 2014/0014592 A1    Jan. 16, 2014

(30) Foreign Application Priority Data
Dec. 30, 2010 (GR) .............................. 20100100743

(51) Int. Cl.
*B01D 11/02* (2006.01)
*C10G 1/04* (2006.01)
*C10L 5/44* (2006.01)
*C10L 9/02* (2006.01)
*C10L 9/08* (2006.01)

(52) U.S. Cl.
CPC ............ *B01D 11/0265* (2013.01); *B01D 11/02* (2013.01); *C10G 1/047* (2013.01); *C10L 5/44* (2013.01); *C10L 9/02* (2013.01); *C10L 9/083* (2013.01); *C10G 2300/1003* (2013.01); *C10G 2300/1011* (2013.01); *C10G 2300/201* (2013.01); *C10G 2300/4006* (2013.01); *C10G 2300/805* (2013.01); *Y02E 50/10* (2013.01); *Y02E 50/14* (2013.01); *Y02E 50/15* (2013.01); *Y02E 50/30* (2013.01); *Y02P 30/20* (2015.11)

(58) Field of Classification Search
CPC ........ C01B 49/02; C10B 53/02; C10B 53/04; C10B 53/06; C10B 53/07; C10B 53/08; C10B 57/00; C10B 57/02; C10B 57/14; C10L 9/00; C10L 9/02; C10L 9/08; C10L 9/083; C10L 9/086; Y02E 50/10; Y02E 50/14; Y02E 50/15; Y02E 50/30; B01D 11/02; B01D 11/0288
USPC ................... 71/11, 12, 13, 14, 15, 22, 23, 24; 210/638, 633, 749
See application file for complete search history.

(56) References Cited

U.S. PATENT DOCUMENTS

| | | | | |
|---|---|---|---|---|
| 4,776,638 A | * | 10/1988 | Hahn | ...................... E21B 7/061 166/248 |
| 2010/0181183 A1 | * | 7/2010 | Koukios | .................. C10B 53/02 201/2.5 |

\* cited by examiner

*Primary Examiner* — Allison Fitzsimmons
(74) *Attorney, Agent, or Firm* — Skokos Law Group; Soula Skokos

(57) ABSTRACT

The invention refers to a methodology for the removal of inorganic components such as potassium, sodium, chlorine, sulfur, phosphorus and heavy metals from biomass of different origins, such as from agricultural, forest or urban origin and any mixture therefrom, from low quality coals such as peat, lignite or sub-bituminous and/or bituminous coals, from urban and/or industrial origin residues and wastes, which are possible to include as much organic—>5 wt %—as inorganic—<95 wt %—material and from sludges that are obtained from sewage treatment plants. The method includes the following steps: providing a salt, mixing water with the salt to produce an aqueous solution that contains salt, leaching the raw material with the aqueous solution that contains salt, preferably a salt containing zirconium or yttrium.

11 Claims, No Drawings

METHOD FOR THE REMOVAL OF INORGANIC COMPONENTS FROM BIOMASS, COALS, WASTES, RESIDUES AND SLUDGES FROM SEWAGE TREATMENT

The present invention refers to a methodology for the removal of inorganic components such as potassium, sodium, chlorine, sulfur, phosphorus and heavy metals from biomass of different origins, such as from agricultural, forest or urban origin and any mixture therefrom, from low quality coals such as peat, lignite or sub-bituminous and/or bituminous coals, from urban and/or industrial origin residues and wastes, which are possible to include as much organic—>5 wt %—as inorganic—<95 wt %—material and from sludges that are obtained from sewage treatment plants.

The problems that are caused nowadays during the thermochemical incineration, combustion, gasification and pyrolysis of biomass are mainly due to the composition of its ash. These problems appear especially when biomass comes from agro, forest and urban environment such as the diverse straw types, agro-industrial residues such as cotton, olive, peanut, etc., as well as tree trimmings and timbers used in building construction and furniture production. Similar problems appear during the use of low quality coals such as peat, lignite and sub-bituminous/bituminous coals, which are mainly used for large scale heat and power generation, of residues and wastes of urban and/or industrial origin as well as of sludges from sewage treatment plants for their secure, economical and environmentally beneficial treatment, neutralization and disposal. The ash of these specific biomass types is very rich in alkali metals, chlorine, sulfur and phosphorus. Therefore, the produced inorganic gases, liquids and solids during the thermochemical biomass conversion tend to react with each other but also with any other inorganic components present during the conversion as well as with the metal surfaces of the reactor causing corrosion, deposition and agglomeration problems. They also produce gas emissions, which result in great financial losses, environmental problems as well as in the inability to use the specific biomass types in large scale, either alone or in combination with solid, liquid and gas fuels for energy, liquid fuels and chemicalsproduction. Similarly, the ash of several low quality coal fuels such as peat, lignite and sub-bituminous and bituminous coals is also rich in alkali metals, chlorine and sulfur, whereby the ash composition differs depending on the coal quality and the specific characteristics of each coal deposit. This creates similar problems, but of lower extent
compared to the problemscreated from the use of other biomass types, however these problems also lead to great financial losses, environmental problems, and limited efficiency in the use of such coals, as well as problems in their application, as in the case of the gasification of lignite with high sodium and chloride content, for energy and/or liquid fuels production.

Furthermore, the ash of residues and wastes from urban and industrial origin as well as of the ash of the sludges from sewage treatment plants is very rich in alkali metals, chlorine, sulfur, phosphorus as well as heavy metals e.g. zinc, lead, copper, chromium, etc. Therefore, the inorganic gases, liquids, and solids produced during the thermochemical conversion of the aforementioned residues/wastes or sludges tend to react with each other or with other inorganic material present, as well as with metal surfaces of the reactors causing corrosion, deposition, agglomeration and gas emissions problems. These phenomena are responsible for great financial losses, environmental problems, low conversion yields in a way that these technologies are not feasible unless they are subsidized as well as in the inability to the use of these specific residues/wastes types and sludges in large scale, either alone or in combination with solid or gas fuels for efficient energy, liquid fuels and chemical production. Moreover, the presence of a great amount of chlorine in the structure of polymer/plastic materials such as the polyvinylchloride (PVC), which constitutes a great percentage of the plastic materials that are contained in the urban solid residues/wastes, results in the production of great amounts of dioxins (PCDD) and furans (PCDF), which are extremely harmful for the human health and all other kinds of life. The capture and/or destruction of these pollutants before they are emitted to the environment requires the application of expensive technologies with even the risk of a possible accident.

Solving the aforementioned problems, will result in the wider use of biomass for the production of energy, liquid fuels and chemicals as well as in a more economical and more efficient use of coals with large economical and environmental benefits, especially nowadays where the energy cost is increasing, while there is an urgent need for the reduction of greenhouse gases generated from fossil fuels used for energy production in order to reduce/eliminate the greenhouse effect. The widespread use of biomass and the more efficient use of low-quality coals, which are used in power generation, are expected to contribute decisively not only in the reduction of greenhouse gases, but also in the cost reduction of energy and fuels production.

In addition, solving the aforementioned problems related to urban and industrial origin residues and wastes as well as sewage treatment plants sludges, will result in the possibility of a wider use of these specific residues and wastes types and sludges in large scale, either alone or in combination with solid and gas fuels for power and/or heat generation, liquid fuels and chemicals production with large economical and environmental benefits. Moreover, it will contribute considerably in the environmental protection by preventing the deposition of this kind of materials in waste dumps and by reducing the energy import particularly nowadays where the imported energy cost is seen to increase, while there is an urgent need for the reduction of greenhouse gases resulting from the utilization of fossil fuels for facing the greenhouse effect.

The currently applied techniques and methods in dealing with these problems have only limited success and, as a consequence, the use of biomass in thermochemical conversion is seen to be very limited worldwide and also restricted mainly in feed stocks such as wood, which causes the fewest problems. As far as the use of low-quality coals is concerned, the specific problems limit their thermochemical conversion efficiency and lead to the use of larger amounts of feed stocks for the production of energy and fuels/chemicals, resulting in the increase of the greenhouse gas emissions and the financially non-efficient exploitation of the coal deposits with high content of alkali metals, chlorine and sulfur. A method that relatively minimizes the aforementioned problems is described in WO/2009003920. Furthermore, the thermochemical exploitation of urban/industrial origin residues and wastes as well as of the sewage treatment plant sludges using thermochemical incineration for the production primarily of heat and in a lower extent of electricity is a high-cost and low energy efficiency solution, which by the way is applied nowadays, for tackling the problem regarding the secure, economical and environmentally beneficial treatment, neutralization and disposal of urban and industrial origin residues and wastes as well as of the sewage treatment plant sludges, due to the problems that are caused by their ash composition and the presence of organic chlorides in the polymer materials. As a result, the percentage of the urban/industrial origin residues/wastes as well as of the sewage treatment plant sludges treated with this technology is relatively low and never exceeds 50-60% of the total available quantities. A method that relatively minimizes the aforementioned problems is described in WO/2009003920.

The object of the invention is to address the aforementioned problems, to improve the properties of the treated material and to minimize gas emissions and corrosion, deposition and agglomeration problems that are caused during the thermochemical conversion of these specific materials. The treated material can be biomass of agro/forest/urban origin or even mixture of biomasses of different origin, low quality coals such as peat, lignite or sub-bituminous and/or bituminous coals, urban and/or industrial origin residues and wastes, which are possible to include as much organic—>5 wt %—as inorganic—<95 wt %—material and sewage treatment plants sludges.

A method for the removal of inorganic components from raw material for the production of clean materials, where raw material is biomass or coal or residues or wastes or sludges or any combination thereof, according to the invention includes the following steps: providing a salt, mixing water with the salt to produce an aqueous solution that contains salt, leaching the raw material with the aqueous solution that contains salt.

The present invention succeeds in the removal of the harmful components of the ash of agro/forest/urban origin biomass, of low-quality coals such as peat, lignite and sub-bituminous and bituminous coals and urban/industrial origin residues/wastes as well as sludges from sewage treatment plants, which can bealkali metals, chlorine, sulfur and phosphorus, heavy metals such as Cu, Pb, Zn, Cr, Hg and organic chloride, which is present in the structure of polymer materials, i.e. plastics, in case of residues/wastes from urban and industrial origin. The removal is carried out before the thermochemical conversion of the specific biomass types, coals, urban/industrial origin residues/wastes as well as sludges from sewage treatment plants to upgrade the material.

The invention can minimize or even eliminate corrosion, ash deposition, agglomeration problems as well as inorganic gas emissions (potassium, sodium, chlorine, sulfur and phosphorus), heavy metals (Cu, Pb, Zn, Cr, Hg), dioxins and furans (PCDD, PCDF) during the thermochemical incineration, combustion, gasification and pyrolysis of the used feedstock, such as biomass of agro/forest/urban origin or even mixture of biomasses of different origin, low-quality coals such as peat, lignite or sub-bituminous and/or bituminous coals from urban and/or industrial origin residues and wastes, which are possible to include as much organic—>5 wt %—as inorganic—<95 wt %—material, and sewage treatment plants sludges.

In case of agro/forest urban biomass origin as well as low-quality coals such as peat, lignite or sub-bituminous and/or bituminous coals, leaching which is a physicochemical treatment produces biomass that is clean, free of alkali metals and chlorine and with significantly lower concentrations of sulfur, phosphorus and heavy metals such as zinc, lead, mercury because inorganic components are removed from the treated materials during this treatment. After the physicochemical treatment, the produced material is characterized as clean biomass in case where biomass is the pretreated material and as upgraded coal in case where the pretreated material is coals. No thermal treatment is applied in this step in order to achieve the claimed results and properties.

In the case of urban, industrial and origin residues and wastes that include polymers, i.e. plastics, the method includes a thermal pretreatment of the raw material, i.e. heating the raw material at a temperature varying from 200° C. up to 350° C. The thermal pretreatment of raw material may be realized in the absence of air, in nitrogen atmosphere for residence time in this specific temperature range varying from 5 min till 1 h, where the moisture content of raw material is lower than 30% in wet basis. The material thus produced has low moisture and low hygroscopicity, it is easily ground, easily mixed with various other materials at different ratios, easily applied in feeding systems used in commercial boilers for energy production and easily pelletized even combined with various other materials at different ratios at low energy consumption. After the thermal pretreatment the produced material from residues or wastes or sewage treatment plant sludges is characterized as synthetic coal and after the thermal and physicochemical treatment step as clean synthetic coal.

Preferably the salt in the aqueous solution that is used from leaching contains zirconium or yttrium.

The concentration of the salts in the aqueous solution preferably varies from 0.1% to 5% w/w in water volume.

Leaching of raw material may be carried out in succession with different aqueous solution, whereby each aqueous solution contains salt.

Leaching is carried out preferably in a reactor at a ratio of raw material over aqueous solution that varies from 33 g/l to 400 g/l, at a temperature varying from 13° C. to 95° C., whereby the leaching time varies from 5 minutes to 60 minutes and whereby the raw material is agitated in the reactor.

Preferably leaching of the raw material is performed with aqueous solution that contains organic and/or inorganic salts and organic and/or inorganic acids and whereby the concentration of the salts and the acids in the aqueous solution varies from 0.1% to 5% w w in water volume.

For relatively better results the raw material consists preferably of particles smaller than 3 cm.

During leaching ultrasound may be applied to the solution.

During the thermal/thermochemical pretreatment stage, the specific biomass types, the low-quality coals, the urban and/or industrial origin residues and wastes as well as the sludges from sewage treatment plants are heated in the absence of air, in nitrogen atmosphere and/or with the presence of a small amount of oxygen and/or air, which is limited in less than 40% of the amount that is required for the stoichiometric oxidation of these materials. The thermal/thermochemical treatment is performed at temperatures from 200° C. up to 350° C., where the best and most economically attractive results are achieved between 250° C. and 320° C., for time periods varying from 5 min till 2 h, where the best and most economically attractive results are achieved between 5 and 40 min residence time in this specific temperature range, i.e. between 250° C. and 320° C. The moisture content of the pretreated material must be lower than 30% in wet basis for the successful pretreatment of the material. The particle size of the pretreated material can vary from some microns up to 15 cm in order for the pretreatment to have the best possible results. This thermal/thermochemical treatment, which is called pre-pyrolysis and in case of using oxygen/air low temperature pre-gasification, achieves the cracking of the organic structure of the various biomass types, low quality coals, urban/industrial origin residues/wastes and sewage treatment plant sludges and their conversion into a material with higher fixed carbon, and less volatile matter content, while it produces a small amount of gases mainly consisting of water, carbon dioxide, carbon monoxide, as well as some light organic components which could be burnt in an internal combustion engine. The heat and exhaust gases produced from this engine could be used to cover the energy demand of pre-pyrolysis/pre-gasification, which by this way becomes energetically self-sufficient. In addition, the overall chlorine content, under the form hydrochloride, from the organic structure of biomass and low quality coals while in case of urban/industrial origin residues/wastes the overall chlorine content in the organic structure of polyvinylchloride material is released as gas-phase hydrochloride, which is absorbed by suitable inorganic materials such as calcium oxide and magnesium oxide thus producing safe and inert chloride salts, preventing its release to the environment. For this reason, the produced gas stream goes through a reactor that contains the appropriate packing material such as calcium oxide and magnesium oxide for the particular bonding reaction.

The various biomass types, low quality coals, urban and/or industrial origin residues and wastes and sewage treatment plant sludges appear to have a mass loss varying from 5% to 70% dry basis depending on the applied conditions while in the optimal case less than 20%. The gross calorific value loss varies from 5% to 40% while in the optimal conditions approximately 7-20%. The higher mass and energy losses are observed in the case straw and grass biomasses are used as the raw materials due to their high reactivity and low lignin content that favors fast and uncontrollable reaction.

The pre-pyrolysis/pre-gasification stage can be realized with the use of different reactors, which are commercially available and are used for other purposes such as fluidized bed reactors, fixed bed reactors, centrifugal reactors, moving bed reactors etc.

During the physicochemical pretreatment, the various biomass types, the low quality coals, the sewage treatment plant sludges as well as the pre-pyrolysed/pre-gasified biomass sample from low quality coals, urban/industrial origin residues/wastes as well as from sewage treatment plant sludges are leached with an inorganic aqueous solution. The physicochemical pretreatment is applied after the pre-pryrolysis/pre-gasification treatment step in the case of the urban/industrial origin residues/wastes in order to achieve the organic chloride elimination.

The leaching pretreatment is realized with the use of commercial leaching reactors, which are already in use in various industrial applications such as biomass fermentation in case of bioethanol production as well as in each application that applies liquid/solid and/or liquid/liquid extraction.

With the help of a stirred system and/or an intense mixing of liquid/solid, faster reaction and effective removal of alkali metals, chlorine, sulfur, phosphorus as well as heavy metals is achieved with small residence time of the material in the reactor. Moreover, the use of ultrasound can be applied for a specific period that can vary from 30 seconds till the entire time of the leaching pretreatment in order to modify the microporous structure of the particles of the pretreated material and facilitate the solvent contact with the particles of the pretreated material in order to accelerate and facilitate the leaching pretreatment process.

The pretreated material can have particle sizes that can vary from some microns up to 10 cm while the best results are achieved for particle sizes smaller than 3 cm.

As inorganic substances applied for the preparation of the aqueous solution for leaching of the pretreated raw material can be used all inorganic acids such as hydrochloric, boric, hydrobromic, hydrofluoric combined with those water soluble calcium, magnesium, aluminum, titanium, zirconium, yttrium and ammonium salts derived from inorganic acids. In the case of zirconium and yttrium also all the water soluble organic salts such as zirconium acetate, yttrium acetate, etc. can also be used. Also mixtures of inorganic/organic salts can be used independently without the presence of inorganic acids to prepare the drastic aqueous solution for the leaching pretreatment process. The use of inorganic/organic salts as well as of their mixtures is preferred against the use of acid/salt mixtures. The proportions of the inorganic/organic solvent used vary from 0.01 up to 30 wt % in the aqueous solution and preferably from 0 up to 10 wt %. In order to avoid creating severely acidic conditions and corrosion problems in the leaching pretreatment process. Preferably, when the solvent is a mixture of salt and acid the acid may be a weak inorganic acid such as boric acid, carbonic acid. These weak acids may also be used in combination with water soluble inorganic calcium, magnesium, aluminum, titanium, zirconium, yttrium and ammonium salts, which salts are derived from strong and weak acids.

As stated before, strong acids can also be used but in this case the concentration will be reduced below 0.1 wt % to avoid creating severely acidic conditions that can lead to corrosion problems. Furthermore, the most affordable and easy to use inorganic acids are those which are in solid form at ambient conditions, so that the costs of transportation, storage and protection of facilities from corrosion are minimized.

As an example of compounds that can be easily used to form the leaching aqueous solution during leaching pretreatment are boric acid as well as calcium nitrate, zirconium nitrate, yttrium nitrate, aluminum nitrate, calcium chloride and/or magnesium chloride and/or aluminum chloride and/or ammonium chloride and or titanium chloride salts.

These inorganic acids such as boric acid, hydrochloric acid, etc. and those from their calcium, magnesium, aluminum, titanium, zirconium, yttrium and ammonium salts that are water soluble as well as the water soluble organic salts of zirconium and yttrium can be mixed with each other in proportions that vary from 0% up to 100% in order to form the active solvent that will be used in the preparation of the aqueous solution. In addition, they can be used for successive extractions so that the desired result is achieved. It is essential that the used inorganic acids are used in combination with some of their water soluble inorganic salts, preferably the salt being more than 20% of the total concentration in the solution, so that the desired result is achieved, while the water soluble inorganic salts of the respective inorganic acids can also be used without the addition of inorganic acid, being mixed in proportion of 0-100% provided that compatibility problems or undesirable reactions do not exist.

The reason that the inorganic acids cannot be used alone without the presence of salts is that when they are used, they remove from the treated material except from the harmful inorganic components such as alkali metals, chlorine, sulfur etc, and beneficial inorganic components such as calcium and magnesium, which are essential during the thermochemical conversion stage because of their catalytic activity for the conversion of fixed carbon and for the total conversion of the reacting material.

The proportions used during the extraction and the use or not of successive extractions depend on the kind and the composition of the pretreated material as well as on the desired properties of the pretreated material. Properties such as ash composition, ash fusion point and ash content in the produced material. Any kind of tap water from a public water supply system, spring, river, lake, etc. can be used for the preparation of the aqueous solutions. The solid to liquid ratio can vary from 33 g/l up to 600 g/l at temperatures from 13° C. up to 95° C. and residence time varying from 5 min till 24 h. The optimal results can be achieved at solid to liquid ratio varying from 150 g/l up to 400 g/l at temperatures from 55° C.

up to 80° C. and residence time varying from 10 min till 35 min, when the intense stirring inside the reactor and/or the conditions of intense mixing of the pretreated material with the aqueous solution are guaranteed. Moreover, the use of ultrasounds in order to modify the micro-porous characteristics of the pretreated material and make the solvent contact with the particles of the pretreated material easier can have a significant advantage especially in the case of physical and/or artificial coals such as biocoal and upgraded coal. The solid to liquid ratio, the treatment temperature and duration as well as the type and the concentration of the water soluble inorganic solvent used depend on the various biomass types, the low quality coals, the urban/industrial origin residues/wastes as well as the sewage treatment plant sludges. During the treatment the water soluble alkali metals, sulfur, phosphorus, heavy metals (Cu, Pb, Zn, Cr, Hg), and chlorine are transferred into the aqueous phase and are removed from the pretreated material. These inorganic components have the form of chloride salts, sulfuric salts as well as carbonate salts, which are water soluble in a great extent and consequently are dissolved in the aqueous solvent under specific conditions. Simultaneously, the alkali metals, sulfur, phosphorus, heavy metals (Cu, Pb, Zn, Cr, Hg), and chlorine that are found in the organic structure of compounds such as the carboxyl salts react with the inorganic solvent that is formed by the mixing of the water soluble inorganic acids and/or the water soluble inorganic salts through ion exchange reactions and are replaced by hydrogen, and/or calcium, and/or magnesium, and/or aluminum, and/or ammonium, and/or titanium and/or zirconium and/or yttrium ions in the organic material structure. At the same time, the inorganic salts replace hydrogen atoms in the structure of carboxyl compounds forming additional carboxyl, calcium, and/or magnesium, and/or aluminum, and/or ammonium, and/or titanium, and/or zirconium and/or yttrium salts increasing in this way the calcium, magnesium, aluminum, titanium, zirconium, yttrium concentration in the ash of the treated material. The aforementioned fact results in the increase of the ratio of the inorganic components that can act as catalysts during the thermochemical conversion process and can potentially increase the activity of the pretreated materials. Furthermore, it results in the increase of the concentration of inorganic components such as magnesium, aluminum, titanium, zirconium, yttrium and calcium, which considerably increases the ash fusion temperature of the pretreated material and eliminates melting, agglomeration and corrosion problems. A % of inorganic compounds such as the alkali carbonate salts that are soluble in acidic environments are being additionally removed due to the acidic nature of the solution. After the end of the leaching pretreatment, the material is dried using mechanical separation processes so that the moisture content in the treated material is decreased down to 40-55% on wet basis and afterwards is dried in rotating or other type dryers till the moisture content is decreased in the required degree for further thermochemical conversion. In case of combustion, up to 10% while in case of gasification up to 20% on wet basis.

In case where the physicochemical pretreatment precedes the thermal/thermochemical one, the pretreated material should be dried down to 30 wt % on wet base so that it can be further used in the thermal/thermochemical pretreatment stage.

The produced material is free of chlorine and alkali metals in the form of water soluble salts and salts of organic acids, which constitute the reactive types of alkali metals that cause emission problems, corrosion/agglomeration and in the majority of the pretreated materials, they may constitute up to 100% of the existing quantity in them, while it contains significantly lower sulfur, phosphorus content that varies from 20%-80% of the initial content, as well as significantly lower content of heavy metals such as zinc, lead, copper, mercury and chromium (Cu, Pb, Zn, Cr, Hg), that varies from 50-90% of the initial content. The reduction rate of sulfur, phosphorus and heavy metals of the final product after the pretreatment depends on the type of the treated material and its ash composition. More specifically, it depends on the percentage of the water soluble as well as on those of combined with the organic material structure inorganic elements and carbonate salts in conjunction with their total content in the pretreated material. In any case, all water soluble inorganic components as well as those which are able to give ion exchange reactions because of their presence in the organic structure of the pretreated materials are removed almost up to 100%. These inorganic components are the reactive components that cause the most significant corrosion, deposition and agglomeration problems as well as gas emissions during the thermochemical conversion.

Their removal leads to a significant reduction or even elimination of the existing problems. The inorganic solvent used as well as the new inorganic salts and acids formed during the pretreatment are recovered during the drying process of the treated material and are separated/recycled in the process.

The recovery of the inorganic components can be realized not only with the use of methods such as azeotropic distillation but also with the application of evaporation and condensation/sinking techniques. Moreover, the use of ion exchange resins can offer significant help to the recovery of useful materials and to the recycling of the active inorganic components. The optimal method will depend on the type of the used/produced inorganic components.

The aqueous residue that remains after the separation of the inorganic compounds, which are used for the preparation of the aqueous solvent for the pretreatment of the various materials, is rich in alkali metals, chlorine, and phosphorus while it can be used as high quality fertilizer. In case of urban/industrial origin residues/wastes as well as sewage treatment plant sludges, it contains significant concentrations of heavy metals. The heavy metals should be removed first through sinking, coagulation processes and/or with the use of other available technologies before the aqueous residue is able to be used as fertilizer.

It is estimated that the physicochemical pretreatment of 100,000 tons of rural biomass with this specific technology can produce more than 1,000 tons of solid potassium, chlorine, phosphorus fertilizer.

The material produced after the application of both treatments has the following characteristics: Less moisture and hygroscopicity due to the destruction of hydrogen bonds during the thermal treatment in case of biomass, urban/industrial origin residues/wastes as well as sewage treatment plant sludges and due to the removal of a large portion of the moisture content, which can exceed 40% in case of coal and sewage treatment plant sludges. Reduced grinding resistance, pulverization easiness, which facilitates the mixing with other materials (carbon, biomass) are further characteristics of the treated material. Increased fixed carbon content and decreased volatile matter content, whereas the 80%-90% of the initial heating value is retained. Free of chlorine and reactive forms of alkali metals.

Significant decrease of sulfur, phosphorus and heavy metals content varying from 20-80% compared to the initial materials depending on their ash composition.

As a result zero chlorine and alkali metal emissions are noticed and therefore, corrosion problems, deposition and agglomeration due to chlorine, alkali metals and their compounds are avoided. Significantly reduced or even zero sulfur, phosphorus, and heavy metals, i.e. Cu, Pb, Zn, Cr, Hg, as well as dioxins and furans emissions without the need for high cost technologies application, and consequently significantly lower cost and greater environmental protection is achieved resulting in the reduction of the gas phase pollutants as well as of the corrosion, deposition, agglomeration caused by the sulfur/phosphorus/heavy metals contained in the ash of various biomass types, low-quality coals, urban/industrial origin residues/wastes as well as sewage treatment plant sludges. The obtained results from the application of the pretreatment technology have shown that chlorine and alkali metal emissions are always zero no matter what the treated materials are. Sulfur can be zero or significantly reduced compared to the initial raw material depending on the treated biomass types of agro/forest/urban origin, on the low-quality coals such as peat, lignite and sub-bituminous and bituminous coals, on urban/industrial origin residues/wastes and sewage treatment plant sludges as well as on their ash composition.

The following examples are presented in order to show the effect of the invention on rural origin biomass, on low quality coals such as lignites as well as on urban origin residues.

EXAMPLE 1

Olive kernel wood from olive kernel oil production plant in Messinia (GR) is prepyrolysed at 300° C. for 1 h in a lab-scale fixed-bed reactor in nitrogen atmosphere. Subsequently, leaching with an aqueous calcium chloride solution 2% (w/w) is applied for 15 min at a solid to liquid ratio 300 g/l using tap water, under constant stirring in a 2 L beaker and constant heating at 30° C. on a hotplate. After the pretreatment, the sample is filtered and dried at 50° C. Table 1 shows the composition of olive kernel wood before and after pretreatment while table 2 presents the composition of its ash content before and after pretreatment. The analysis of the pretreated material shows an increase in the fixed carbon and heating value while the volatile matter and oxygen content are decreased. Ash analysis of the olive kernel wood showed that the treated material does not contain chlorine and reactive alkali metals at all, calcium concentration is increased, while sulfur and phosphorus concentration are considerably reduced compared to the initial material.

The amounts of alkali metals, sulfur and phosphorus remained in the ash of the pretreated material are considered to be non reactive and as a result their ability to cause ash-related problems is marginal. This has also been verified by ash melting behavior measurements.

EXAMPLE 2

Wheat straw from North Dakota (US), which has a high content of alkali metals and chloride is washed with an aqueous solution of boric acid and calcium chloride 0.5% (w/w) for 15 min at a solid to liquid ratio 120 g/l using tap water, under constant stirring in a 2 L beaker and constant heating at 20° C. on a hotplate. The mixture of active substances consists of 80% boric acid and 20% calcium chloride having total concentration of 0.5% (w/w) in the solution. After the pretreatment, the sample is filtered and dried at 50° C. Table 1 shows the composition of wheat straw before and after pretreatment while table 2 presents the composition of its ash content before and after pretreatment. Ash analysis of the wheat straw showed that the treated material does not contain any chlorine, it contains only negligible amounts of reactive alkali metals, calcium concentration is significantly increased whereas the sulfur and phosphorus concentration appear to be significantly reduced compared to the initial material. Regarding this example, no thermal treatment is carried out.

The amounts of alkali metals, sulfur and phosphorus remained in the ash of the pretreated material are considered to be non reactive and as a result their ability to cause ash-related problems is marginal. This has also been verified by ash melting behavior measurements.

TABLE 1

Analysis and characterization of raw and pretreated olive kernel wood and wheat straw.

| Proximate analysis (% d.b.) | Raw olive kernel wood | Pretreated olive kernel wood | Raw wheat straw | Pretreated wheat straw |
|---|---|---|---|---|
| Moisture | 9.5 | 2.56 | 7.76 | 4.88 |
| Ash | 4.60 | 5.58 | 1 1.18 | 9.93 |
| Volatile matter | 76.0 | 29.25 | 71.89 | 74.66 |
| Fixed carbon | 19.40 | 62.68 | 16.93 | 15.41 |
| Ultimate analysis (% d.b.) | | | | |
| Carbon | 50.7 | 72.98 | 42.73 | 41.09 |
| Hydrogen | 5.89 | 3.51 | 5.32 | 5.15 |
| Nitrogen | 1.36 | 1.79 | 0.67 | 0.58 |
| Sulfur | 0.3 | 0.07 | 0.25 | 0.16 |
| Chlorine | 0.18 | <0.01 | 0.44 | <0.01 |
| Oxygen | 36.97 | 13.59 | 41.25 | 42.82 |
| Heating value (MJ/kg) | 21 .21 | 28.2 | 16.28 | 17.5 |

TABLE 2

Ash analysis and characterization of raw and pretreated olive kernel wood and wheat straw.

| Analysis (%) | Raw olive kernel wood | Pretreated olive kernel wood | Raw wheat straw | Pretreated wheat straw |
|---|---|---|---|---|
| $SiO_2$ | 32.6 | 32.8 | 69.4 | 78.8 |
| MgO | 3.79 | 2.58 | 1.98 | 0.34 |
| $Al_2O_3$ | 2.96 | 3.32 | 0.5 | 0.3 |
| CaO | 10.22 | 40.8 | 5.4 | 15.18 |
| $Fe_2O_3$ | 1.9 | 5.46 | 0.2 | 0.32 |
| $TiO_2$ | 0.1 | 0.15 | 0.02 | 0.1 |
| $P_2O_5$ | 4.65 | 2 | 2 | 1.01 |
| $K_2O$ | 27.23 | 6.1 | 13.6 | 4.75 |
| $Na_2O$ | 4.17 | 1.5 | 0.23 | 0.2 |
| $SO_3$ | 4.97 | 2.48 | 1.61 | 1.1 |
| Cl | 1.43 | <0.01 | 2.73 | <0.01 |

EXAMPLE 3

Switchgrass from North Dakota (US) is washed with an aqueous solution of calcium chloride 1% (w/w) for 5 min at a solid to liquid ratio 120 g/l using tap water, under constant stirring in a 2 L beaker and constant heating at 20° C. on a hotplate. After the pretreatment, the sample is filtered and dried at 50° C. Table 3 shows the composition of switchgrass before and after pretreatment while Table 4 presents the composition of its ash content before and after pretreatment. The analysis of the pretreated material shows a slight increase in volatile matter and heating value while at the same time a small decrease in the ash content is realized as well as a significant decrease of sulfur and nitrogen concentration with simultaneous disappearance of chloride. The relatively small reduction of the ash content is due to the use of calcium chloride, which enriches the switchgrass ashtoa large extent, thus keeping the overall ash content of the pretreated material relatively close to the ash content of the initial raw material. The ash analysis of switchgrass showed indeed that the pretreated material does not contain any chlorine and reactive alkali metals, calcium concentration is significantly increased, while sulfur, magnesium and phosphorus concentration are considerably reduced compared to the initial material. The amounts of alkali metals, sulfur and phosphorus remained in the ash of the pretreated material are considered to be non reactive and as a result their ability to cause ash-related problems is marginal. This has also been verified by ash melting behavior measurements.

TABLE 3

Analysis and characterization of raw and pretreated switchgrass.

|  | Rawswitchgrass | Pretreatedswitchgrass |
|---|---|---|
| Proximate analysis (% d.b.) | | |
| Moisture | 4.33 | 4.87 |
| Ash | 8.64 | 10.55 |
| Volatile matter | 71.89 | 69.95 |
| Fixed carbon | 19.47 | 19.5 |
| Ultimate analysis (% d.b) | | |
| Carbon | 47.83 | 46.37 |
| Hydrogen | 6.56 | 6.22 |
| Nitrogen | 1.4 | 1.27 |
| Sulfur | 0.54 | 0.21 |
| Chlorine | 0.2 | <0.01 |
| Oxygen | 34.83 | 35.38 |
| Heating value (MJ/kg) | 17.22 | 17.5 |

TABLE 4

Ash analysis and characterization of raw and pretreated switchgrass.

| Analysis (%) | Rawswitchgrass | Pretreatedswitchgrass |
|---|---|---|
| $SiO_2$ | 55.1 | 45.1 |
| MgO | 5.6 | 3.1 |
| $Al_2O_3$ | 3.3 | 1.4 |
| CaO | 9.3 | 36.7 |
| $Fe_2O_3$ | 2.3 | 3.5 |
| $TiO_2$ | 0.15 | 0.13 |
| $P_2O_5$ | 2.65 | 1.98 |
| $K_2O$ | 15.65 | 6.1 |
| $Na_2O$ | 1.12 | 0.26 |
| $SO_3$ | 2.46 | 1.53 |
| Cl | 2.3 | <0.01 |

EXAMPLE 4

A number of rural wastes and residues which includes the olive kernel wood, the wheat straw, the by-product of bioethanol production from corn (DDGS) and the switchgrass suffer leaching with an aqueous calcium chloride solution 0.5% (w/w) for 15 min at a solid-to liquid ratio 200 g/L in case of olive kernel wood and DDGS, whereas in case of wheat straw and switchgrass at a solid-to liquid ratio 120 g/L, using distilled water under constant stirring in a 2 L beaker and constant heating at 30° C. on a hotplate. The aqueous calcium chloride solution is 2% (w/w) in the case of DDGS. In addition, lignite with particle size less than 0.5 mm from North Dakota (US) is washed with an aqueous solution of boric acid (0.8% (w/w)) and calcium chloride (0.4% (w/w)) for 30 min using tap water, under constant stirring in a 2 L beaker and constant heating at 60-70° C. on a hotplate. After the pretreatment, the sample is filtered and dried at 50° C. Subsequently, the initial raw samples as well as the pretreated ones are ashed in a high temperature oven at 600° C. Afterwards the produced ashes suffer thermal treatment in the same high temperature oven so that their fusion point is determined. The thermal treatment includes the ash heating at 800° C. initially for one hour and then the progressive heating at higher temperatures using a temperature step of 100° C. up to the determination of the fusion point, which is declared with the change in the natural shape of each sample and its vitrification. Table 5 presents the ash fusion points for the raw as well as for the pretreated biomass feedstocks. As it can be seen in Table 5, the ash fusion point of the pretreated materials is increased above 500° C. on average due to the removal of alkali metals, chloride, sulfur and phosphorus during the pretreatment. The best thermal behavior is observed in case of wheat straw, which is considered the most difficult biomass feedstock for thermochemical conversion worldwide. In case of lignite, the melting point is observed to increase by 200° C., which is expected to have a positive impact on the use of lignite for electricity generation by drastically reducing the problems of unit availability due to ash melting problems.

TABLE 5

Thermal behavior of the ash from raw and pretreated with an aqueous solution of calcium chloride biomass feedstock.

| Ash samples | Fusion Point (° C.) |
|---|---|
| Raw olive kernel wood | 850 |
| Pretreated olive kernel wood | 1350 |
| Rawwheat straw | 800 |
| Pretreatedwheat straw | 1500 |
| Raw DDGS | 800 |
| PretreatedDDGS | 1350 |
| Raw switchgrass | 850 |
| Pretreatedswitchgrass | 1400 |
| Raw lignite | 1000 |
| Pretreated lignite | 1250 |

EXAMPLE 5

A number of rural wastes and residues which includes the olive kernel wood from Greece, the wheat straw from Alabama, the by-product of bioethanol production from corn (DDGS) from Wisconsin, the switchgrass from North Dakota, the arundodonax from Oregon and the rice straw from Greece suffer leaching with different aqueous solutions of aluminum nitrate, zirconium acetate and yttrium nitrate 2% (w/w) for 15 min at a solid-to liquid ratio 150 g/L in case of olive kernel wood and DDGS, whereas in case of wheat straw, arundodonax, sugarcane trash and switchgrass at a solid-to liquid ratio 100 g/L, using distilled water under constant stirring in a 2 L beaker and constant heating at 30° C. on a hotplate. In addition, lignite with particle size less than 0.5 mm from North Dakota (US) is washed with an aqueous solution of aluminum nitrate and also with an aqueous solution of zirconium acetate for 30 min using tap water, under constant stirring in a 2 L beaker and constant heating at 75° C. on a hotplate. After the pretreatment, the sample is filtered and dried at 50° C. Subsequently, the initial raw samples as well as the pretreated ones are ashed in a high temperature oven at 600° C. Afterwards the produced ashes suffer thermal treatment in the same high temperature oven so that their fusion point is determined. The thermal treatment includes the ash heating at 800° C. initially for one hour and then the progressive heating at higher temperatures using a temperature step of 100° C. up to the determination of the fusion point, which is declared with the change in the natural shape of each sample and its vitrification. Table 6 presents the ash fusion points for the raw as well as for the pretreated biomass feedstocks. As it can be seen in Table 6, the ash fusion point of the pretreated materials is increased above 500° C. on average due to the removal of alkali metals, chloride, sulfur and phosphorus during the pretreatment. The best thermal behavior is observed in case of wheat straw, which is considered the most difficult biomass feedstock for thermochemical conversion worldwide. In case of lignite, the melting point is observed to increase by 400° C., which is expected to have a positive impact on the use of lignite for electricity generation by drastically reducing the problems of unit availability due to ash melting problems.

TABLE 6

Thermal behavior of the ash from raw and pretreated with aqueous solutions of aluminum nitrate, zirconium acetate and yttrium nitrate biomass feedstock.

| Ash samples | Fusion Point (° C.) |
| --- | --- |
| Raw olive kernel wood | 850 |
| Pretreated olive kernel wood (Al salt) | 1400 |
| Pretreated olive kernel wood (Zr salt) | 1400 |
| Pretreated olive kernel wood (Zr salt) | 1400 |
| Raw wheat straw | 800 |
| Pretreated wheat straw (Al salt) | 1500 |
| Pretreated wheat straw (Zr salt) | 1500 |
| Pretreated wheat straw (Y salt) | 1500 |
| Raw DDGS | 800 |
| Pretreated DDGS (Al salt) | 1350 |
| Pretreated DDGS (Zr salt) | 1350 |
| Pretreated DDGS (Y salt) | 1350 |
| Raw switchgrass | 850 |
| Pretreated switchgrass (Al salt) | 1400 |
| Pretreated switchgrass (Zr salt) | 1400 |
| Pretreated switchgrass (Y salt) | 1400 |
| Raw rice straw | 850 |
| Pretreated rice straw (Al salt) | 1500 |
| Pretreated rice straw (Zr salt) | 1500 |
| Pretreated rice straw (Y salt) | 1500 |
| Raw arundo donax | 800 |
| Pretreated arundo donax (Al salt) | 1500 |
| Pretreated arundo donax (Zr salt) | 1500 |
| Pretreated arundo donax (Y salt) | 1500 |
| Raw lignite | 1000 |
| Pretreated lignite (Al salt) | 1400 |
| Pretreated lignite (Zr salt) | 1400 |
| Pretreated lignite (Y salt) | 1400 |

EXAMPLE 6

ArundoDonax an energy crop from Oregon (US) is washed with an aqueous solution of Aluminum nitrate 1% (w/w) for 10 min at a solid to liquid ratio 120 g/l using tap water, under constant stirring in a 2 L beaker and constant heating at 30° C. on a hotplate. After the pretreatment, the sample is filtered and dried at 50° C. Table 7 shows the composition of arundodonax before and after pretreatment while Table 8 presents the composition of its ash content before and after pretreatment. The analysis of the pretreated material shows an increase in volatile matter and heating value while at the same time a significant decrease in the ash content is realized as well as a significant decrease of sulfur and nitrogen concentration with simultaneous disappearance of chloride. The ash analysis of arundodonax showed indeed that the pretreated material does not contain any chlorine and reactive alkali metals, aluminum concentration is significantly increased, while sulfur, magnesium and phosphorus concentration are considerably reduced compared to the initial material. The amounts of alkali metals, sulfur and phosphorus remained in the ash of the pretreated material are considered to be non reactive and as a result their ability to cause ash-related problems is marginal. This has also been verified by ash melting behavior measurements.

TABLE 7

Analysis and characterization of raw and pretreated arundodonax.

| | Raw arundodonax | Pretreated arundodonax |
| --- | --- | --- |
| Proximate analysis (% d.b.) | | |
| Moisture | 32.13 | 43.46 |
| Ash | 10.24 | 6.28 |
| Volatile matter | 81.68 | 85.46 |
| Fixed carbon | 8.08 | 8.26 |
| Ultimate analysis (% d.b.) | | |
| Carbon | 44.6 | 45.4 |
| Hydrogen | 5.84 | 6.02 |
| Nitrogen | 0.6 | 0.48 |
| Sulfur | 0.102 | 0.02 |
| Chlorine | 0.69 | <0.01 |
| Oxygen | 37.93 | 41.79 |
| Heating value (MJ/kg) | 17.53 | 17.90 |

TABLE 8

Ash analysis and characterization of raw and pretreated arundodonax

| Analysis (%) | Raw arundodonax | Pretreated arundodonax |
| --- | --- | --- |
| $SiO_2$ | 37.79 | 63.06 |
| MgO | 1.37 | 0.96 |
| $Al_2O_3$ | 0.78 | 9.24 |
| CaO | 4.20 | 2.87 |
| $Fe_2O_3$ | 1.46 | 1.59 |
| $TiO_2$ | 0.10 | 0.16 |
| $P_2O_5$ | 4.20 | 4.30 |
| $K_2O$ | 26.76 | 7.17 |
| $Na_2O$ | 0.49 | 0.48 |
| $SO_3$ | 7.13 | 2.87 |
| Cl | 6.74 | <0.01 |

The invention concerns a method for the removal of the harmful components of the biomass ash of agro/forest/urban origin, low quality coals such as peat, lignite and sub-bituminous/bituminous coals, urban/industrial origin residues/wastes and sewage treatment plant sludges before the thermochemical incineration, combustion, gasification, pyrolysis of the aforementioned materials.

Examples of the method that have been described include either solely a physicochemical stage, i.e. leaching the material with an aqueous solution that contains salts, or a thermal/thermochemical stage, i.e. pre-pyrolysis of the material, as well as leaching.

During the thermal/thermochemical pretreatment stage, the materials are heated in the absence of air, in nitrogen atmosphere and/or with the presence of a small oxygen/air amount, which is limited in less than 40% of the amount that is required for the stoichiometric oxidation of these materials, at temperatures from 200° C. up to 350° C., where the best and most economically attractive results are achieved between 250° C. and 320° C. for time periods varying from 5 min till 2 h.

During the physicochemical pretreatment stage, the materials are washed with an aqueous solution of inorganic substances. As inorganic substances are used/can be used all inorganic acids such as hydrochloric, boric, hydrobromic, hydrofluoric, etc. combined with those from their calcium, magnesium, aluminum, titanium, zirconium, yttrium and ammonium salts that are water soluble in proportions of 0.01 up to 30% wt. in the aqueous solution, especially in proportions of 0.1 up to 10% wt.

According to the method, the physicochemical stage is used for the production of clean materials free of corrosion, deposition and ash agglomeration problems, free of gas emissions (potassium, sodium, chlorine, sulfur and phosphorus) and heavy metals (Cu, Pb, Zn, Cr, Hg), during the thermochemical incineration, combustion, gasification, pyrolysis of specific biomass feedstocks of agro/forest/urban origin, low quality coals such as peat, lignites and sub-bituminous/bituminous coals and sewage treatment plant sludges.

The invention claimed is:

1. A method for the removal of inorganic compounds from raw material for the production of clean materials, the raw material is biomass or coal or residues or wastes or sludges or any combination thereof, the method including the following steps: providing a salt, wherein the salt contains zirconium or yttrium, mixing water with the salt to produce an aqueous solution that contains salt, and leaching the raw material with the aqueous solution that contains salt, wherein the method further comprises subsequent leachings carried out in succession with different aqueous solutions, wherein each aqueous solution contains salt, and wherein the leachings are carried out in a reactor at a ratio of raw material over aqueous solution that varies from 33 g/l to 400 g/l, at a temperature varying from 13° C. to 95° C., wherein the leaching time varies from 5 minutes to 60 minutes, and wherein the raw material is agitated in the reactor.

2. A method according to claim 1, whereby the concentration of salts in each aqueous solution varies from 0.10% to 5% w/w in water volume.

3. A method according to claim 1, wherein each aqueous solution further comprises organic salts and organic or inorganic acids and wherein the concentration of the salts and the acids in each aqueous solution varies from 0.10% to 5% w/w in water volume.

4. A method according to claim 1, whereby the raw material does not contain any polymer and the removal of inorganic components from raw material for the production of clean materials is effected solely by leaching and without any thermal pretreatment of the raw material.

5. A method according to claim 1, whereby the raw material consists of particles, whose size is smaller than 3 cm.

6. A method according to claim 1, whereby during leaching ultrasound is applied to the solution.

7. A method according to claim 1, whereby the raw material contains polymers and the method includes a thermal pretreatment of the raw material, wherein the thermal pretreatment comprises heating the raw material to a temperatures range of from 200° C. up to 350° C.

8. A method according to claim 7, where the thermal pretreatment of raw material is realized in the absence of air, in nitrogen atmosphere for a residence time in the temperature range varying from 5 min to 1 h, where the humidity of raw material is less than 30% in wet base.

9. A method according to claim 7, where the thermal pretreatment of raw material is realized in nitrogen atmosphere with the presence of an amount of oxygen or air, which is limited to less than 40% of the amount required for the stoichiometric oxidation of the raw material, a residence time in the temperature range varying from 5 min to 1 h, where the humidity of raw material is less than 30% in wet base.

10. A method according to claim 7, whereby the thermal pretreatment precedes any of the leachings.

11. A method according to claim 7, whereby the thermal pretreatment follows any of the leachings.

* * * * *